March 3, 1964 P. BIEBER 3,123,046
HORSE JUMP WITH SIMULATED BRUSH
Filed Feb. 27, 1962

Philip Bieber
INVENTOR.

BY *[signatures]*
Attorneys 3,123,046
HORSE JUMP WITH SIMULATED BRUSH
Philip Bieber, Coral Gables, Fla.
Filed Feb. 27, 1962, Ser. No. 175,968
13 Claims. (Cl. 119—29)

The present invention generally relates to horse racing, and more particularly to a horse jump provided with a simulated brush.

One of the more exciting forms of horse racing is that involving the use of barriers or jumps requiring the horse to leap in the air during the course of the race. In most instances these jumps are formed of a plurality of baby cedar trees or bushes positioned next to each other so as to form an elongated bush spanning all or a portion of the width of the race track. The use of baby cedars however is an expensive proposition due to the rapid deterioration of the cedars brought about by repeated contact of portions of the horse, such as the hooves, with the baby cedars. An additional expense involved in the use of baby cedars is brought about by the special care needed to grow and maintain these baby cedars so as to form a jump of the proper height and consistency.

Accordingly, one of the primary objects of the present invention is the provision of a horse jump which requires a minimum amount of care.

A further object of the present invention is the provision of a horse jump having a simulated brush.

An additional object of the present invention is the provision of a horse jump which can be easily stored or transported.

Another object of the present invention is the provision of a horse jump which can withstand repeated contact with various portions of a horse's body without any noticeable deterioration of the jump brush.

A further object of the present invention is the provision of a horse jump formed of a plurality of bunches of rod-like members which can be individually placed without changing or altering the shape, consistency or height of the jump hedge.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
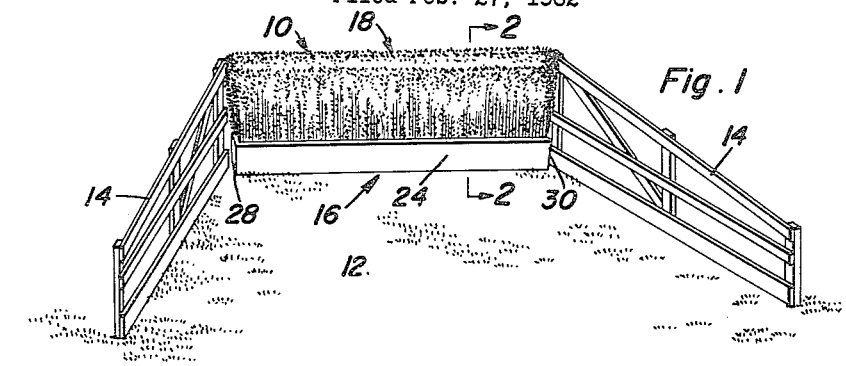
FIGURE 1 is a perspective view of the horse jump of the present invention arranged in position for use.

Referring now more particularly to the drawings, reference numeral 10 generally designates the horse jump of the present invention. The horse jump 10, in position for use, is arranged transverse of a track 12 and provided at each of its ends with outwardly diverging fences or rails 14 provided for the purpose of defining the boundaries of the horse jump and guiding the horses toward the jump. The horse jump 10 of the present invention consists basically of two sections, a trough or base 16 and a brush or bush 18.

The trough 16 consists of an open top 20, two sides 22 and 24 and a bottom 26. This trough 16 is generally rectangular and can be formed of concrete, wood, plastic, or any other suitable material. The width of the trough 16 is generally twenty to twenty-four inches and the length is variable in accordance with the requirements of the various different race tracks. As will be noted in FIGURES 1 and 3, the trough 16 is additionally provided with two integral ends 28 and 30 thus completely enclosing the trough on five sides.

The brush section 18 of the jump 10 consists of a plurality of bunches 32 comprising a plurality of rod-like members 34, each formed with a flexible, resilient spring wire core 36 having a plastic coating 38 thereon. This plastic coating 38, in addition to covering the spring wire 36, is provided with a plurality of twig-like projections 40 formed thereon and projecting therefrom in a manner so as to simulate, when combined in the bunch or bundle 32, a hedge or bush. Additionally, it is contemplated that the plastic coating 38 with the projecting twig-like members 40 be green in color so as to further increase the appearance of a living bush. A plurality of the rod-like members 34 are secured together into a bundle 32 by means of an encircling band 42 which may be of metal, rope, or any other suitable material.

As illustrated in the drawings, the lower ends of the rods 34 are generally not provided with the twig-like projections 40, however, the lower ends 44 are preferably provided with the plastic coating 38. The upper ends 46 of the rod-like members 34 are provided with the twig-like projections down to approximately the height of the walls 22 and 24 of the trough 16.

The brush or bush 18 can be of any desired height, however, sixty-two inches is generally the maximum height for horse jumps such as is contemplated in the present invention. It is also preferred that the forward edge of the jump be rolled as at 33 so as to allow the horse to go over the low part first. The majority of the rod-like members 34 formed of substantially equal height equivalent to the maximum height desired for the particular jump. The remainder of the rod-like members 34 are formed of various lesser heights thereby forming a brush wherein the consistency or thickness is increased toward the base thereby resulting in an increase in the rigidity of the brush as the base is approached. Inasmuch as the majority of the rod-like members 34 are of equal height, the provision of the shorter members, while strengthening the bunches or bundles 32, will not affect the general appearance of the brush or bush 18.

Further, various different gauges of spring steel are used to simulate the natural tree having both thick and thin branches, with small branches of heavier gauge spring steel being used to act as a brake to prevent a snapping back of the longer members after the bending of such longer members. These longer members, after being forced forward by the jumping horse, will come in contact with the shorter heavy members upon their return, thus reducing the speed of the return so as to prevent a snapping action.

Figure 2:
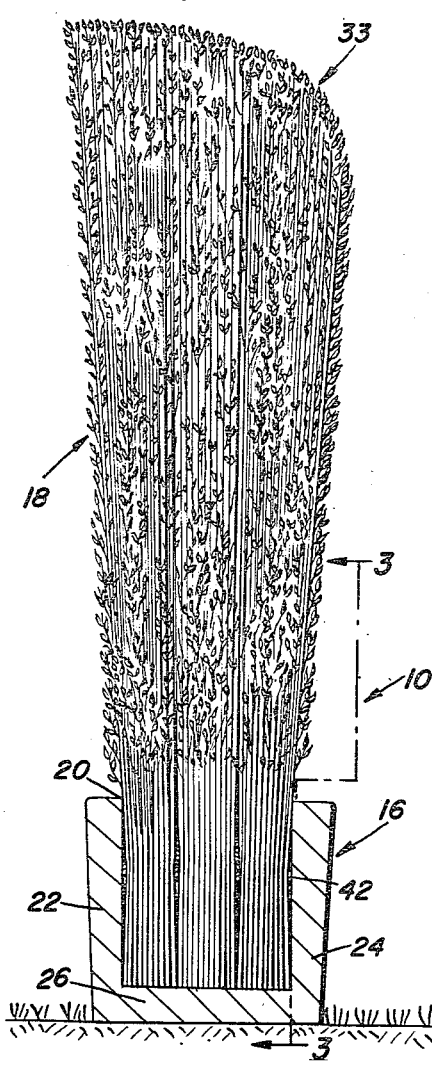
FIGURE 2 is a cross-sectional view taken substantially on a plane passing along line 2—2 in FIGURE 1.
Figure 4:
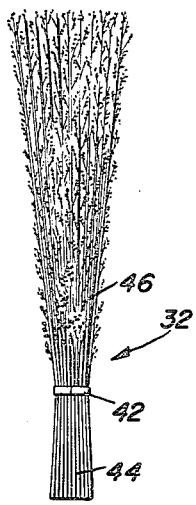
FIGURE 4 is an elevational view of one of the bunches of rod-like members comprising the present invention.
Figure 3:
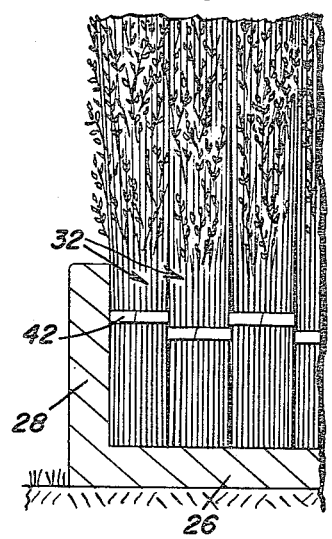
FIGURE 3 is a partial cross-sectional view taken substantially on a plane passing along line 3—3 in FIGURE 2.
Figure 5:
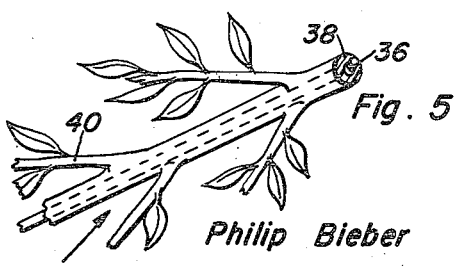
FIGURE 5 is a sectional view illustrating one of the plastic coated rods or spring wires of the present invention.

As illustrated in FIGURES 2 and 3, the bundles 32 are inserted into the trough 16 so as to form a comparatively tight fit between the adjacent bundles 32 and the sides 22 and 24 and the ends 28 and 30 of the trough 16 thereby frictionally securing the bundles 32 in a manner so as to simulate a hedge or bush 18. Single stems, if so desired, can also be used as fillers or replacements.

As is readily apparent from the foregoing description, the present invention, by the use of spring wire elongated members coated with plastic and secured in bundles which in turn are engaged within an upstanding trough, has provided a simulated horse jump highly superior to the existing horse jumps now in use.

The horse jump of the present invention is not subject to rapid deterioration, and even in the event that the replacement of a portion of the jump becomes necessary, this can be done efficiently and rapidly by merely removing the damaged bundles and replace them with new bundles which will be of exactly the same height and consistency as the removed bundles. Additionally, the jump of the present invention can be readily dismantled and stored thereby requiring no care whatsoever between the racing seasons such as would obviously be required in the use of a living hedge. As is readily apparent from the foregoing description, the hedge or jump comprising the present invention can, if so desired, be used in other types of racing, such as for example greyhound racing.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An elongated horse jump comprising a plurality of vertically orientated individual flexible, resilient rod-like members, means engaged with the lower ends of said members retaining said members upright and in close proximity to each other, the upper portions of said members being free to flex upon being contacted by a horse jumping thereover, selected ones of said rod-like members being shorter than the majority of the rod-like members whereby a greater density is achieved in the lower portion of the jump than in the upper portion of the jump, said shorter members slowing the return movement of the longer members after a deflection of these longer members.

2. The structure of claim 1 wherein the shorter members are generally thicker and less flexible than the longer members.

3. The structure of claim 2 wherein the rod-like members are formed of spring wire coated with a protective plastic material.

4. The structure of claim 3 wherein the plastic coating is formed with a plurality of outwardly extending twig-like projections.

5. The structure of claim 4 wherein the means retaining the rod-like members upright consists of an elongated upwardly opening closed end trough, the lower ends of said rod-like members being secured within the trough by frictional engagement between each other and the walls of the trough.

6. The structure of claim 5 wherein the twig-like projections are provided on only those portions of the rods which project above the trough.

7. The structure of claim 6 wherein the rod-like members are arranged in bundles of a predetermined number and arrangement of rod-like members.

8. The structure of claim 1 wherein the rod-like members are formed of spring wire coated with a protective plastic material.

9. The structure of claim 8 wherein the means retaining the rod-like members upright consists of an elongated upwardly opening closed end trough, the lower ends of said rod-like members being secured within the trough by frictional engagement between each other and the walls of the trough.

10. The structure of claim 8 wherein the rod-like members are arranged in bundles of a predetermined number and arrangement of rod-like members.

11. A horse jump comprising an elongated substantially rectangular upwardly opening closed end trough, and a plurality of upwardly extending flexible, resilient rod-like members, said rod-like members being arranged in predetermined numbers in individual bunches, said bunches having the lower ends thereof secured within the trough along the full length thereof by frictional engagement between each other and the walls of the trough, said rod-like members consisting of spring wire coated with plastic.

12. The structure of claim 11 wherein selected ones of said rod-like members are shorter than the majority of said rod-like members, said shorter members preventing a snapping action on the part of the longer members during their return to their normal position after being deflected.

13. The structure of claim 12 wherein the upper approach edge of the jump is rolled.

References Cited in the file of this patent

UNITED STATES PATENTS

| | | |
|---|---|---|
| 1,295,581 | Palmer | Feb. 25, 1919 |
| 1,604,621 | Wallace | Oct. 26, 1926 |
| 2,279,539 | Vogt et al. | Apr. 14, 1942 |
| 2,716,828 | Adler | Sept. 6, 1955 |

FOREIGN PATENTS

| | | |
|---|---|---|
| 28,950 | Great Britain | Dec. 22, 1911 |